April 13, 1926.
A. A. SMITH
KNIFE
Filed August 24, 1925
1,580,693
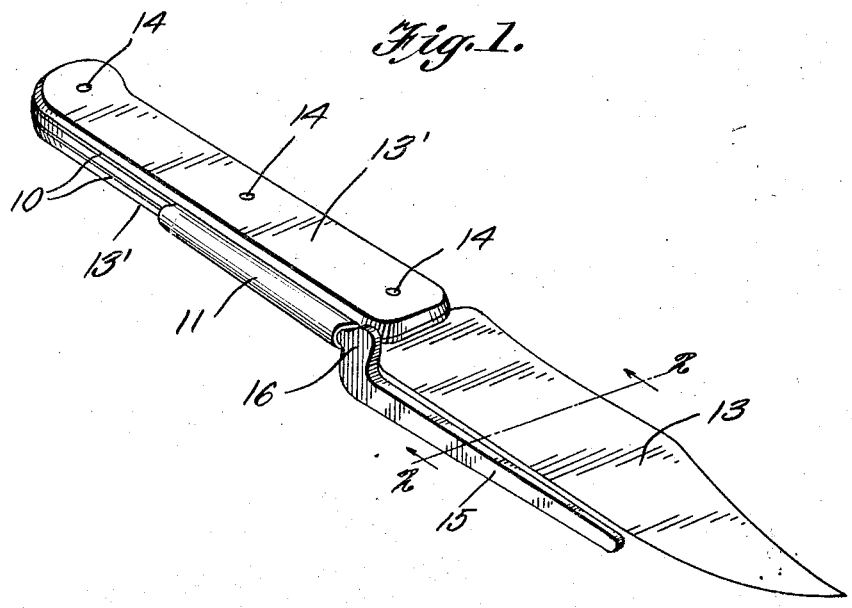
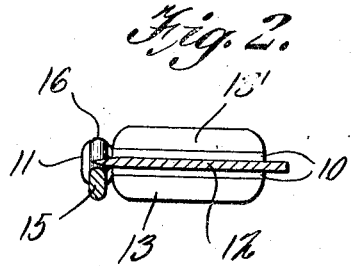
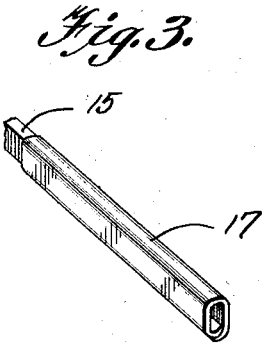
Abram A. Smith,
INVENTOR
BY Victor J. Evans
ATTORNEY
WITNESS:

Patented Apr. 13, 1926.

1,580,693

UNITED STATES PATENT OFFICE.

ABRAM A. SMITH, OF ST. JOSEPH, MICHIGAN.

KNIFE.

Application filed August 24, 1925. Serial No. 52,051.

*To all whom it may concern:*

Be it known that I, ABRAM A. SMITH, a citizen of the United States, residing at St. Joseph, in the county of Berrien and State of Michigan, have invented new and useful Improvements in Knives, of which the following is a specification.

This invention relates to improvements in knives for culinary use and which contemplates the provision of a guard mounted thereon for mounting upon either side of the knife blade whereby users being either right or left handed may pare vegetables and the like at a desired thickness.

Another object of my invention is the provision of a sleeve detachably engaged upon the guard for facilitating closer paring and consequently a greater saving of the article pared.

With the above and other objects in view, the invention further includes the following novel features and details of construction, to be hereinafter more fully described, illustrated in the accompanying drawing and pointed out in the appended claims.

In the drawing:—

Figure 1 is a perspective of the knife showing the guard applied thereto.

Figure 2 is a sectional view taken on line 2—2 of Figure 1.

Figure 3 is a fragmentary elevation of the guard showing the sleeve positioned thereon.

Referring to the drawing in detail, wherein like characters of reference denote corresponding parts, the reference characters 10 indicate a pair of relatively flat substantially elongated companion plates being formed by bending upon themselves in forming a sleeve 11 thereon, while a knife blade 12 being positioned therebetween while the shank 12 of the knife blade 13 being positioned therebetween and the plates 10 having handles 13' secured to their outer sides, all of which being held rigidly secured as a single unit through the instrumentality of fastening elements in the form of rivets 14.

In order to provide means for positioning upon the opposite sides and adjacent the cutting edge of the blade 13, I provide guard arms 15 having their respective inner end portions communicating with a relatively enlarged offset portion 16 whereby either end of the guards may be readily and easily inserted within the sleeve 13 for positioning the guards upon the opposite sides of the cutting edge of the blade 13 for use by both right and left handed persons.

It will thus be noted from the foregoing description and accompanying drawing that the ends of the guards 15 may be readily and easily inserted within the sleeve 11 whereby right and left handed persons may use my invention effectively as well and the relative arrangement of the guards 15 with respect to the cutting edge of the blade 13 being set as to allow a desired space therebetween through which the parings of fruit and vegetables may pass during the process of paring in order that the fruit or vegetable may be evenly pared and prevent undue waste of the food stuff.

When it is desirous, in the paring of fruit and vegetables, to pare them thinner in the saving of the food stuff an auxiliary sleeve 17 is then detachably engaged and slided upon the outer free end of the guard 15 in order that the space between the outer end of the guard 15 and the cutting edge of the blade 13 will be materially reduced and consequently a thinner paring will pass therebetween.

The invention is susceptible of various changes in its form, proportions and minor details of construction and the right is herein reserved to make such changes as properly fall within the scope of the appended claims.

Having described my invention what is claimed is:—

1. A knife comprising a handle having a pair of companion plates forming a sleeve upon one side and receiving the knife shank therebetween, and a guard received within the sleeve and extending longitudinally therefrom and in spaced relation with respect to the cutting edge of the knife.

2. A knife of the character described comprising a pair of companion plates being bent upon themselves upon one side and forming a sleeve thereon, a knife having its shank received between the companion plates, a pair of companion handle members secured to the outer sides of the plates, and a pair of guards having their inner meeting end portions connected to a relatively enlarged offset portion and having their outer free end portions of the guard extending longitudinally and in spaced relation with respect to the cutting edge of the knife.

3. A knife of the character described comprising a pair of companion plates formed by being bent upon themselves upon one side and forming a sleeve thereon, a knife having its shank received between the plates, a pair of companion handles secured to the outer sides of the plates, a pair of longitudinally disposed guards having their meeting end portions connected to and formed integral with a relatively enlarged offset portion and adapted to have one end positioned within the sleeve and the opposite end extending longitudinally and in spaced relation with respect to the cutting edge of the knife.

4. A knife of the character described comprising a pair of companion plates formed by being bent upon themselves upon one side and forming a sleeve thereon, a knife having its shank received between the plates, a pair of companion handles secured to the outer sides of the plates, a pair of longitudinally disposed guards having their meeting end portions connected to and formed integral with a relatively enlarged offset portion and adapted to have one end positioned within the sleeve and the opposite end extending longitudinally and in spaced relation with respect to the cutting edge of the knife, and an auxiliary sleeve received upon the outer free end of the guard for reducing the space between the guard and the cutting edge of the knife for facilitating a thinner paring.

In testimony whereof I affix my signature

ABRAM A. SMITH.